United States Patent
Butucea Panait et al.

(10) Patent No.: US 11,550,677 B2
(45) Date of Patent: Jan. 10, 2023

(54) CLIENT-LESS DATABASE SYSTEM RECOVERY

(71) Applicant: International Business Machines Corporation, Armonk, NY (US)

(72) Inventors: Marcel Butucea Panait, Brno (CZ); Erik Rueger, Ockenheim (DE); Nicolo Sgobba, Fasano (IT); Michal Paluch, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 17/101,341

(22) Filed: Nov. 23, 2020

(65) Prior Publication Data

US 2022/0164266 A1    May 26, 2022

(51) Int. Cl.
| | | |
|---|---|---|
| *G06F 11/20* | (2006.01) | |
| *G06F 16/27* | (2019.01) | |
| *G06F 11/14* | (2006.01) | |
| *G06F 16/23* | (2019.01) | |

(52) U.S. Cl.
CPC ...... *G06F 11/2092* (2013.01); *G06F 11/1469* (2013.01); *G06F 11/1471* (2013.01); *G06F 16/2365* (2019.01); *G06F 16/27* (2019.01)

(58) Field of Classification Search
CPC ............. G06F 11/2092; G06F 11/1469; G06F 11/1471; G06F 16/2365; G06F 16/27
See application file for complete search history.

(56) References Cited

U.S. PATENT DOCUMENTS

| | | | |
|---|---|---|---|
| 10,387,262 B1* | 8/2019 | Chikkanayakanahally | G06F 11/1461 |
| 10,719,407 B1* | 7/2020 | Chockalingam | G06F 11/1461 |
| 10,936,545 B1* | 3/2021 | Chockalingam | G06F 11/1448 |
| 2013/0238554 A1* | 9/2013 | Yucel | G06F 11/1415 707/610 |
| 2016/0077929 A1* | 3/2016 | McAlister | G06F 11/1469 707/681 |
| 2016/0147614 A1 | 5/2016 | Mittal | |
| 2018/0024893 A1* | 1/2018 | Sella | G06F 21/554 707/648 |
| 2018/0285201 A1* | 10/2018 | Bangalore | G06F 11/2097 |
| 2018/0285353 A1 | 10/2018 | Ramohalli Gopala Rao | |
| 2018/0322018 A1* | 11/2018 | Matsumoto | G06F 3/0613 |
| 2019/0132390 A1* | 5/2019 | Chakraborty | H04L 67/1097 |
| 2019/0197142 A1 | 6/2019 | Glaser | |
| 2019/0294706 A1 | 9/2019 | Dubost | |
| 2019/0377642 A1* | 12/2019 | Khan | G06F 11/2028 |
| 2020/0133784 A1* | 4/2020 | Bhanushali | G06F 16/122 |
| 2020/0142781 A1 | 5/2020 | Lee | |
| 2020/0301943 A1* | 9/2020 | Robinson | G06F 16/5846 |

(Continued)

*Primary Examiner* — Bryce P Bonzo
*Assistant Examiner* — Michael Xu
(74) *Attorney, Agent, or Firm* — Randy Tejeda (57) ABSTRACT

One or more computer processors install a trigger on a primary database. The one or more computer processors, responsive to the trigger activating and a data modification associated with the primary database, format the data modification into a universal format for a plurality of backup databases. The one or more computer processors rotate an active backup database from the plurality of backup databases based on a determined alternating backup period. The one or more computer processors synchronize in real-time the primary database with the active backup database.

18 Claims, 7 Drawing Sheets

(56) References Cited

U.S. PATENT DOCUMENTS

| | | | | |
|---|---|---|---|---|
| 2020/0409908 | A1* | 12/2020 | Ahn | G06F 3/0607 |
| 2021/0303412 | A1* | 9/2021 | Hempelmann | G06F 16/1734 |
| 2022/0083433 | A1* | 3/2022 | Saad | G06F 11/1464 |
| 2022/0121523 | A1* | 4/2022 | Upadhyay | G06F 11/1464 |
| 2022/0121527 | A1* | 4/2022 | Upadhyay | G06F 11/1451 |
| 2022/0138054 | A1* | 5/2022 | Prasad | G06F 11/1469 707/679 |

* cited by examiner

CLIENT-LESS DATABASE SYSTEM RECOVERY

BACKGROUND

The present invention relates generally to the field of databases, and more particularly to database recovery.

Database recovery is the process of restoring the database to a correct state in the event of a failure by restoring the database to the most recent consistent state that existed shortly before the time of system failure. The failure may be the result of a system crash due to hardware or software errors, a media failure, such as head crash, or a software error in the application, such as a logical error in the program that is accessing the database.

SUMMARY

Embodiments of the present invention disclose a computer-implemented method, a computer program product, and a system. The computer-implemented method includes one or more computer processers installing a trigger on a primary database. The one or more computer processors, responsive to the trigger activating and a data modification associated with the primary database, format the data modification into a universal format for a plurality of backup databases. The one or more computer processors rotate an active backup database from the plurality of backup databases based on a determined alternating backup period. The one or more computer processors synchronize in real-time the primary database with the active backup database.

DETAILED DESCRIPTION

Many industries, such as telecommunications or payment facilitation companies, require always-available systems to ensure efficient and effective operations. For example, for payment facilitation companies the availability of data is paramount to continue effective billing and business operations. Here, if a critical database system fails, business transactions for clients will fail and prevent standard business operations. Traditional database availability and recovery systems allow for recoverability in a multitude of situations but fail to reduce system load from a main data collection system. Frequently, when databases systems begin to fail, recovery systems and operations are inundated with transactional load, further applying stress to a vulnerable system.

Embodiments of the present invention recognize that database recovery is improved through low overhead distributed data by means of a control node replicating information to a plurality of backup databases (i.e., standby nodes). In this embodiment, the standby nodes are utilized as read-only replicas. Embodiments of the present invention alternate between synchronous and asynchronous backup operations to one or more distributed databases ensuring the safety of data under a plurality of different types of faults and while providing read/write access to diverse applications that require near real-time access to the contained data. Embodiments of the present invention allow for immediate recovery of a database upon failure from read-only copies and transaction logs without requiring persistent storage assigned for cloud environments with database systems instantiated in containerized environments. Embodiments of the present invention rotate said nodes at a temporal schedule based on time-out period or number of transactions for uninterrupted database operation and continuation from standby nodes. In this embodiment, responsive to data corruption or system failure, embodiments recover information from the plurality of standby nodes depending on the type of failure. Embodiments of the present invention enables determined switching between synchronous and asynchronous operations. Embodiments of the present invention improve transaction load from a primary data collection system while facilitating recovery operations in case of several types of failures such data integrity problem, database management system failure, power loss failure, hardware failure, connectivity failure, security intrusions, etc. Implementation of embodiments of the invention may take a variety of forms, and exemplary implementation details are discussed subsequently with reference to the Figures.

The present invention will now be described in detail with reference to the Figures.

Figure 1:
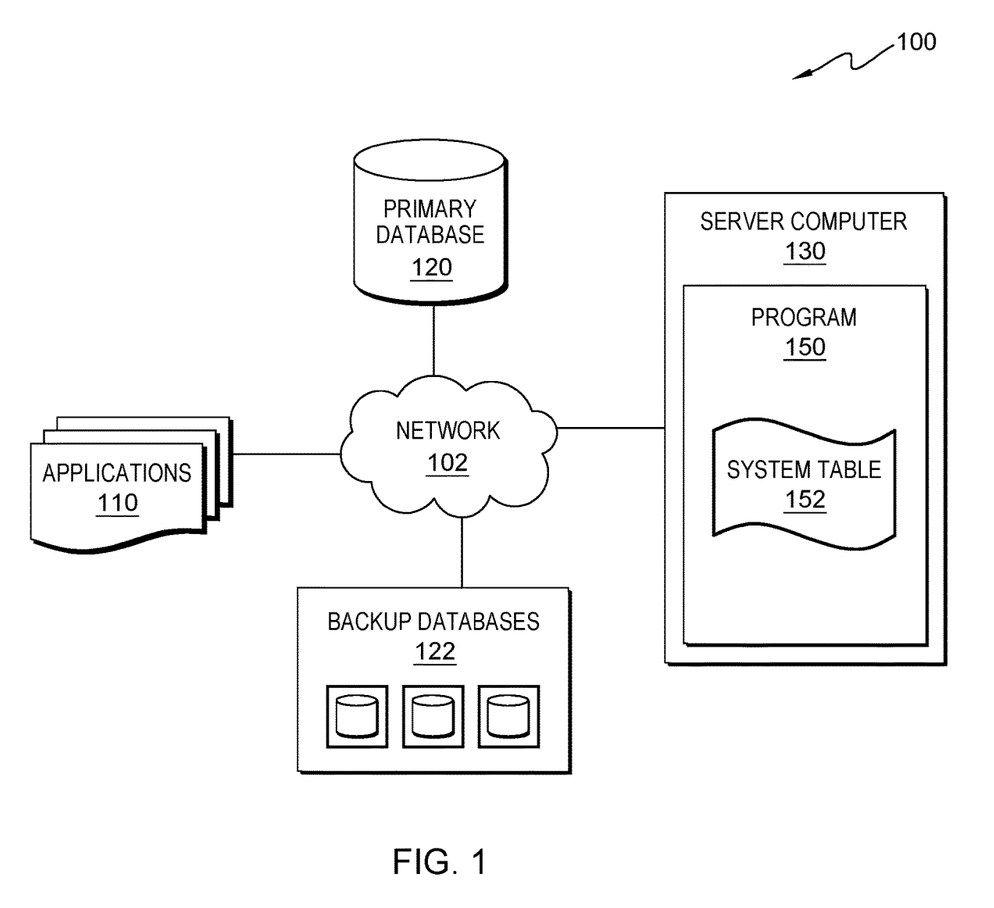
FIG. 1 (i.e., FIG.) is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 130 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 130 and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Applications 110 is a set of one or more programs designed to carry out the operations for a specific application to perform an activity (e.g., data collection, payment transaction management, etc.). Applications 110 require continuous access to information contained in primary database 120. In an embodiment, applications 110 may reside on server computer 130 or on server computer (not shown) connected over network 102.

Server computer 130 can be a standalone computing device, a management server, a web server, a mobile computing device, or any other electronic device or computing system capable of receiving, sending, and processing data. In other embodiments, server computer 130 can represent a server computing system utilizing multiple computers as a server system, such as in a cloud computing environment. In another embodiment, server computer 130 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 102. In another embodiment, server computer 130 represents a computing system utilizing clustered computers and components (e.g., database server computers, application server computers, etc.) that act as a single pool of seamless resources when accessed within distributed data processing environment 100. In the depicted embodiment, server computer 130 includes program 150. In other embodiments, server computer 130 may contain other applications, databases, programs, etc. which have not been depicted in distributed data processing environment 100. Server computer 130 may include internal and external hardware components, as depicted and described in further detail with respect to FIG. 4.

Primary database 120 is a repository for data used by applications 120. In an embodiment, primary database 120 resides on a server computer or elsewhere within distributed data processing environment 100 provided applications 110 and program 150 has access to primary database 120. A database is an organized collection of data. Primary database 120 can be implemented with any type of storage device capable of storing data and configuration files that can be accessed and utilized by applications 110 and program 150, such as a database server, a hard disk drive, or a flash memory. In an embodiment, primary database 120 represents a primary database cluster containing a plurality of primary databases working in tandem.

Backup databases 122 is a set of one or more backup databases (e.g., standby nodes) that are read-only replicas of primary database 120. Backup databases 122 are updated utilizing a temporal schedule based on time-out period or number of transactions. Backup databases 122 are utilized responsive to data corruption or system failure to recover information depending on the type of failure. Backup databases 122 allow for uninterrupted database operation and continuation. In an embodiment, backup databases 120 represents a plurality of backup clusters, each cluster containing a plurality of backup databases.

Program 150 (i.e., control node) is a program for implementing a real-time database backup method capable of alternating synchronous and/or asynchronous backup operations between a plurality of distributed databases. In various embodiments, program 150 may implement the following steps: install a trigger on a primary database; responsive to the trigger activating and a data modification associated with the primary database, format the data modification into a universal format for a plurality of backup databases; rotate an active backup database from the plurality of backup databases based on a determined alternating backup period; and synchronize in real-time the primary database with the active backup database. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within distributed data processing environment 100. Program 150 includes system table 152. System table 152 stores data modifications captured by an installed database trigger. In an embodiment, system table 152 establishes a path from primary database 120 to backup databases 122. Program 150 is depicted and described in further detail with respect to FIG. 2.

The present invention may contain various accessible data sources, such as primary database 120 and backup databases 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
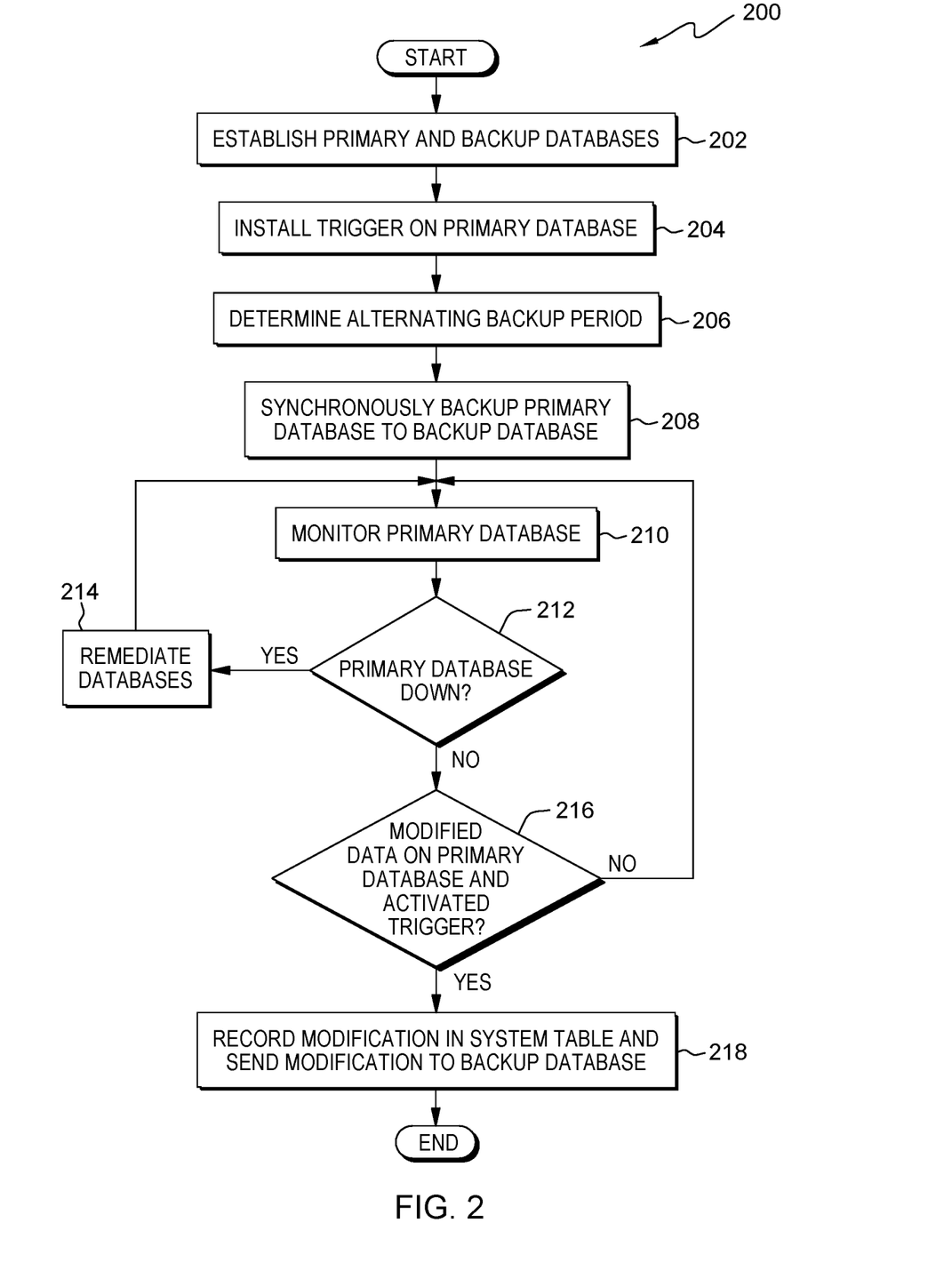
FIG. 2 is a flowchart depicting operational steps of a program, on a server computer within the data processing environment of FIG. 1, for implementing a real-time database backup system capable of alternating synchronous and/or asynchronous backup operations between a plurality of distributed databases, in accordance with an embodiment of the present invention.

FIG. 2 depicts flowchart 200 illustrating operational steps of program 150 for implementing a real-time database backup method capable of alternating synchronous and/or asynchronous backup operations between a plurality of distributed databases, in accordance with an embodiment of the present invention.

Program 150 establishes a primary database and a plurality of backup databases (step 202). In an embodiment, program 150 initiates responsive to a user command, a user provided database, or a provided database uniform access link (URL). In an embodiment, program 150 creates primary database 120 and provides initial data. In this embodiment, applications 110 utilize primary database 120 for all transactions (e.g., read or write). In an alternative embodiment, program 150 receives primary database 120 or is provided access to primary database 120. In a further embodiment, program 150 creates backup databases 122 as read-only replicas of primary database 120, wherein each database in backup databases 122 may have distinct data.

Program 150 installs a trigger on the primary database (step 204). Program 150 installs a trigger (i.e., condition) on primary database 120 controlling real-time synchronous backup for primary database 120. In an embodiment, the trigger is based on a number of transactional changes, a specific time interval, or whether a database transfer size threshold is reached (e.g. >50 MB). Program 150 establishes system table 152 on server computer 130 (i.e., control node) for storing data modification captured by the trigger. In an embodiment, system table 152 establishes a route from primary database 120 to backup databases 122. In another embodiment, program 150 installs a trigger associated with the entire database including all comprised tables. In yet another embodiment, program 150 installs a trigger on one or more comprised tables. In another embodiment, program 150 install a trigger on one or more rows comprised in a table.

Program 150 determines an alternating backup period (step 206). In an embodiment, program 150 determines an alternating backup period such that no backup database in backup databases 122 simultaneously synchronizes one or more data modifications on primary database 120 in real time, but backup databases 122 alternates synchronization in a time-sharing manner as defined by a value T For example, program 150 sets T to a 10 second interval. In an embodiment, program 150 adjusts the alternating backup period based on the specifications of the backup databases, where the specifications include database permissions, network latency, geographical distances, database capacity, redundancy, etc. For example, program 150 dynamically adjusts (e.g., increases) the alternating backup period based on an increase in general network latency. In an embodiment, program 150 adjusts T as a counter rather than a time interval, where the counter is activated as a backup database reaches a transferred data threshold (e.g., >50 megabytes of data).

Program 150 synchronously backups the primary database to backup database (step 208). Program 150 synchronizes primary database 120 with one or more backup databases (i.e., backup databases 122) utilizing the determined alternating backup period from step 206. For example, based on the determined alternating backup period, program 150 synchronizes primary database 120 with a first backup database (i.e., designated real-time backup database) contained in backup databases 122, while a second backup database is inactive. In this embodiment, the real-time backup database also receives all asynchronous backups. In a further embodiment, program 150, after a T interval, program 150 ceases data synchronization between primary database 120 and the first backup database, program 150 then commences synchronization between primary database 120 and the second database. Here, program 150 utilizes the determined alternating backup period to continuously rotate backup databases while continuously synchronizing data from primary database 120. In these embodiments, program 150 utilizes backup databases 122 to mitigate a plurality of different database failures, such as complete database failure or partial data failure by distributing a plurality of varying backups across a plurality of backup databases. For example, when a failure occurs on primary database 120 and comprised data cannot be recovered, program 150 utilizes data synchronized to backup databases 122 to continue database operations. This synchronized data can be directly utilized for real-time recovery. Further, responsive to a backup database failure, remaining backup databases are utilized for data recovery within business defined recovery point objectives (RPO) and recovery time objectives (RTO).

Program 150 monitors the primary database (step 210). Responsive to an established alternating backup period, program 150 continuously monitors primary database 120 for activated triggers and data modification (e.g., add, removal, or adjustment of data). In an embodiment, program 150 utilizes a "heartbeat" daemon associated with primary database 120 to monitor associated health and performance metrics, such as uptime, database size, component table sizes, query response time, data errors, data throughput, etc. In another embodiment, program 150 runs a plurality of periodic tests in order to identify a failure in primary database 120. In another embodiment, program 150 receives performance and data integrity reports from applications 110, allowing program 150 to detect issues at an application level.

If the primary database is down, ("yes" branch, decision block 212), then program 150 remediates the databases (step 214). Responsive to program 150 detecting a full data failure for monitored primary database 120, program 150 remediates primary database 120 with backup databases 122. In an embodiment, program 150 replaces primary database 120 with a synchronized backup database. In this embodiment, the replaced database is changed into a backup database and the synchronized backup database is established as primary database 120. In an embodiment, remediation includes, but is not limited to, failover backup, primary backup transfer, partial data transfer, notification of failure to administrators.

Responsive to a partial data failure where partial data in primary database 120, program 150 recovers the partial data failure from real-time synchronized data available in backup databases 122. In an embodiment, program 150 removes the installed trigger of primary database 120 associated with the failed data. In a further embodiment, program 150 synchronizes the partial data contained in backup databases 120 to primary database 120. For example, primary database 120 suffers a partial data loss where a table is compromised. In this example, program 150 replaces the compromised table with synchronized data on the active backup database within backup databases 122. In a further embodiment, responsive to the data replacement, program 150 installs a new trigger associated with the partial data failure (e.g., compromised table) on primary database 120. In an embodiment, program 150 shifts all primary database 120 operations to backup databases 122 as primary database 120 is remediated. This embodiment avoids substantial service disruption during the recovery process. In an embodiment, program 150 adjusts the trigger (e.g., sensitivity values) based on the failure. For example, program 150 adjusts the trigger to be more responsive to data modifications, allowing more frequent data synchronizations and in turn more active backup database rotations.

During data recovery or restoration, if primary database 120 is unable to respond to subsequent data operations on a failed table, in order to avoid substantial service disruption, program 150 redirects said operations to the real-time backup database, where data operations are conducted from the real-time backup database as defined by a plurality of service requirements, such as RPO and RTO. In another embodiment, responsive to a partial data failure (e.g., table failure) associated with primary database 120 and responsive to non-availability of a real-time backup database, program 150 removes the trigger associated with the partial data failure and utilizes a last successful data synchronization and associated backup database to restore the partial data failure. In this embodiment, program 150 replays transactions from stored log file (i.e., system table 152) until the latest stored transaction is completed. In a further embodiment, program 150 restores the removed trigger. In these embodiments, program 150 provides immediate recovery of a database upon failure from read-only copies and transaction logs without requiring persistent storage assigned for cloud environments with database systems instantiated in containerized environments.

If the primary database is up, ("no" branch, decision block 212), then program 150 checks for modified data on the primary database and an activated trigger. (decision block 216).

If there is modified data on the primary database and an activated trigger, ("yes" branch, decision block 216), then program 150 records the modification in a system table and sends the modification to backup database (step 218). In an embodiment, responsive to detected data modification (e.g., adding a row to a table) and an activated trigger, program 150 stores the modified data and corresponding modification metadata to system table 152. Concurrently, program 150 transmits the modified data captured in system table 152 to backup databases 122, specifically the one or more backup databases (i.e., real-time backup databases) selected to synchronously receive data updates from primary database 120. In an embodiment, program 150 formats real-time data changes into a universal format for a plurality of database types, allowing a high-availability recovery system comprising a plurality of diverse databases and database clusters. For example, program 150 formats the data changes (e.g., data modification) in an extensible markup language (XML) independent of the underlying database system. In a further embodiment, program 150 stores data changes captured in the current rotation period in a log file.

If there is no modified data on the primary database or an inactivated trigger, ("yes" branch, decision block 216), then program 150 continues to monitor the primary database (step 210).

Figure 3A:
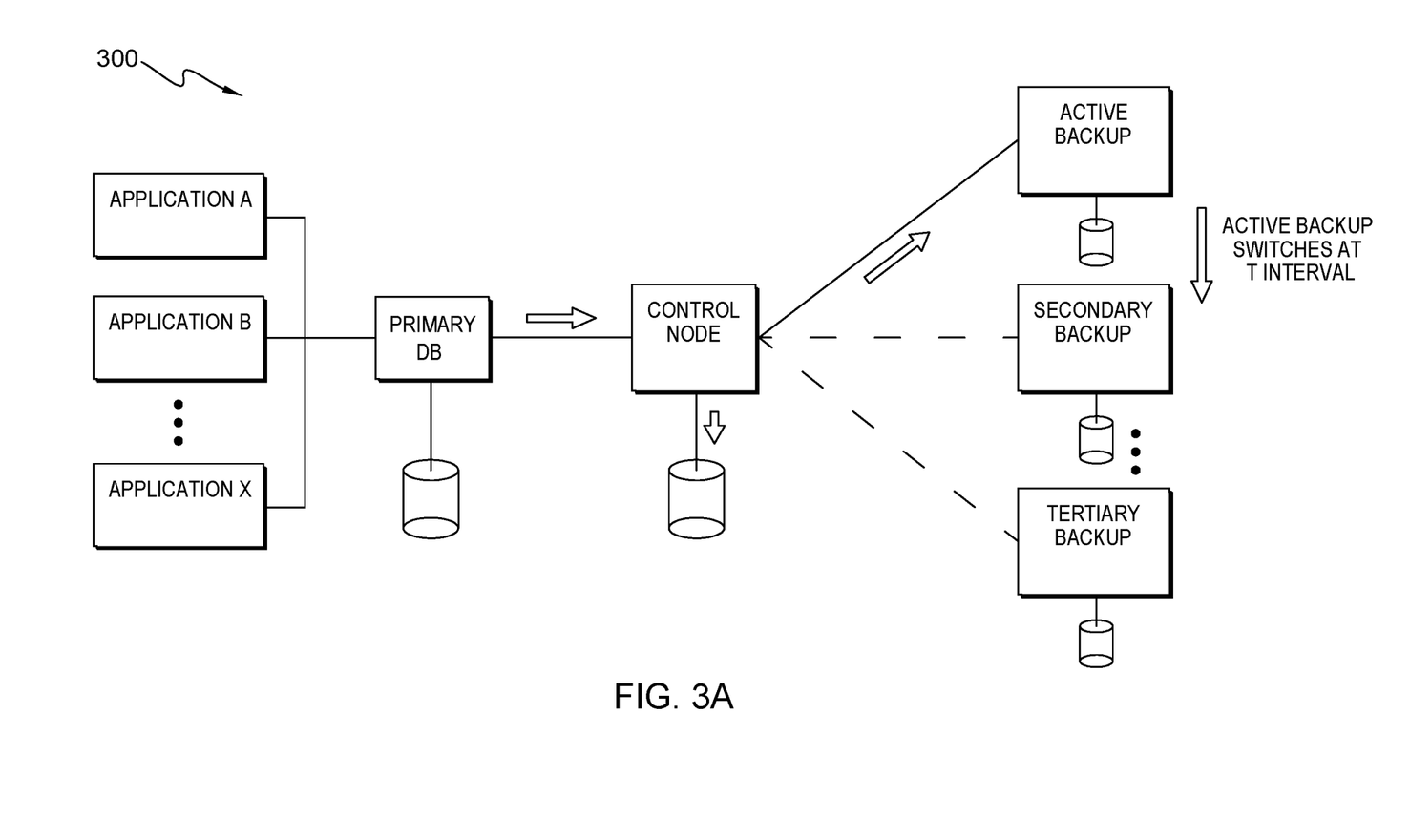
FIGS. 3A-3D contain a plurality of illustrations depicting a plurality of recovery embodiments, in accordance with an embodiment of the present invention.
Figure 3B:
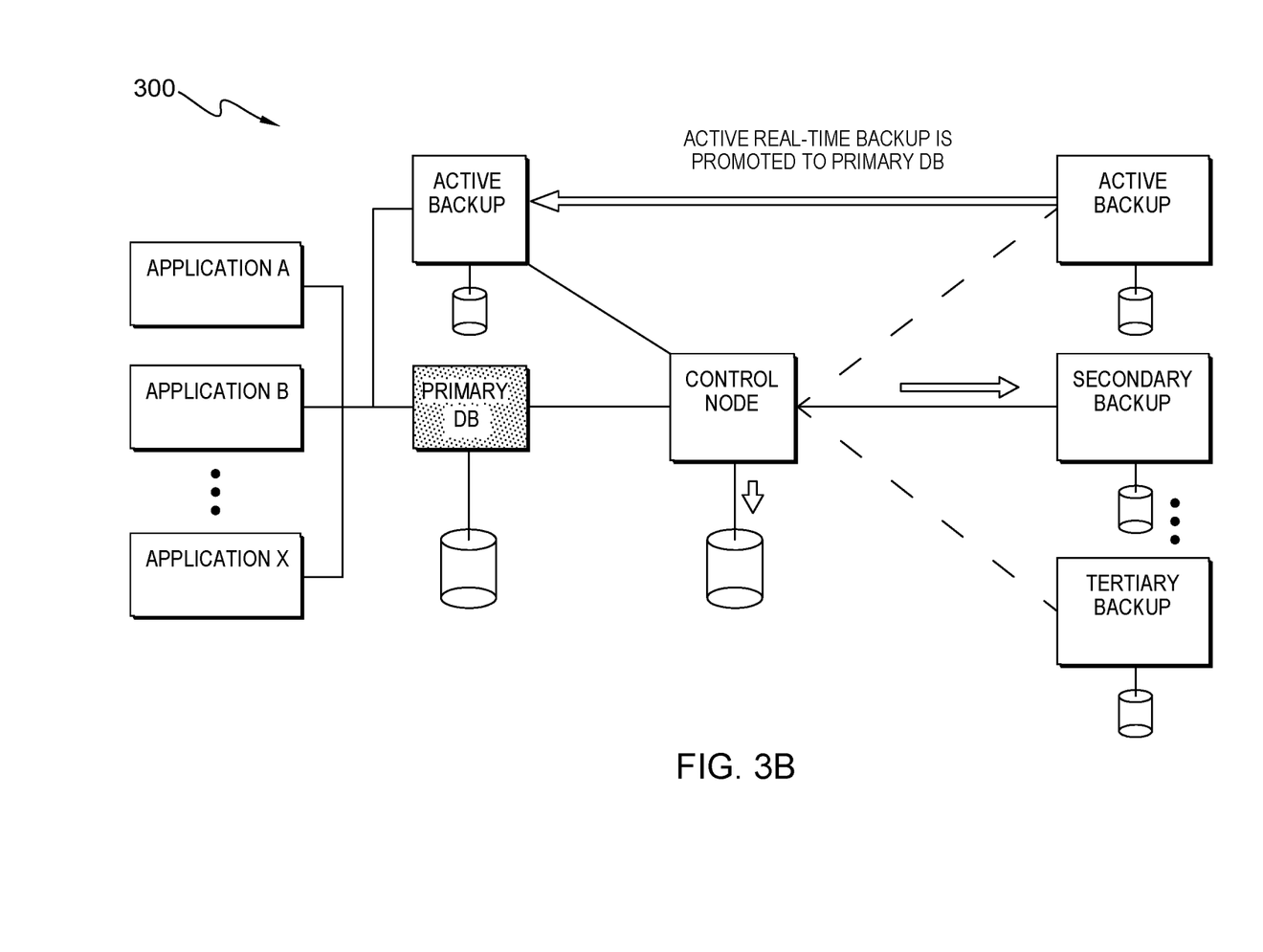
Figure 3C:
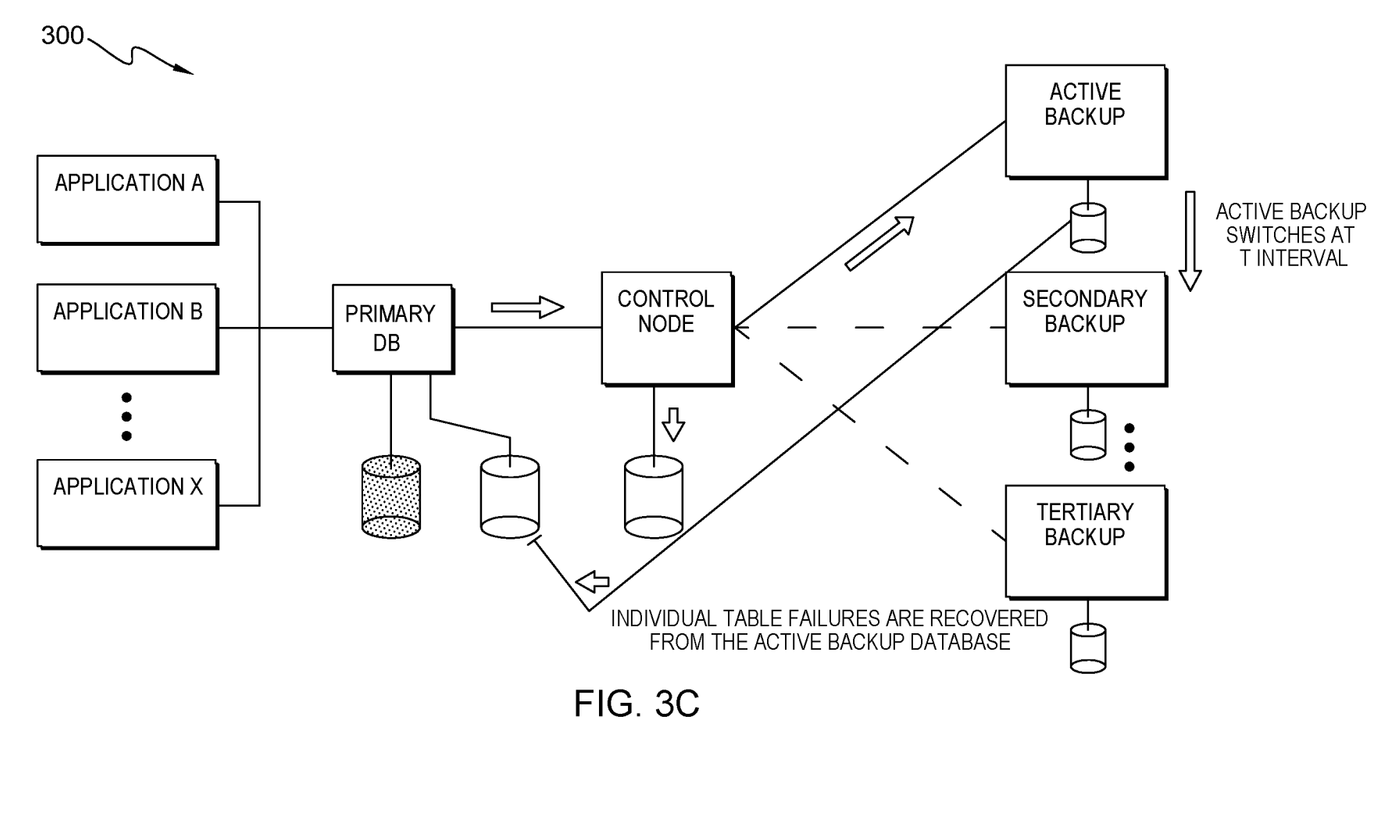
Figure 3D:
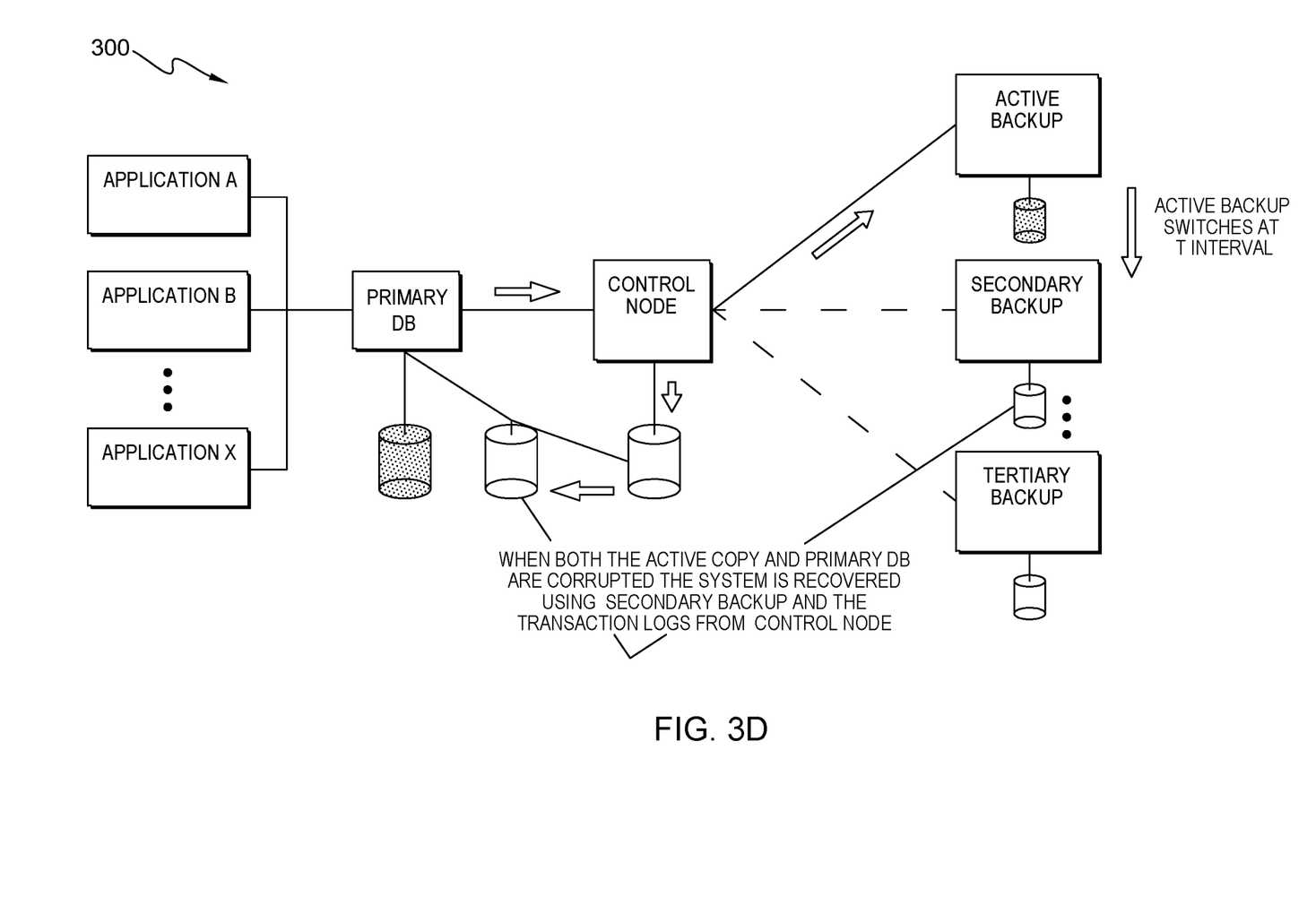

FIGS. 3A-3D contain a plurality of illustrations depicting a plurality of recovery embodiments, in accordance with an embodiment of the present invention. FIG. 3A depicts an initial database recovery implementation comprising a plurality of applications accessing a primary database (DB), a control node (i.e., program 150) a plurality of backups, where a backup in the plurality of backups is an active or real-time backup. Here, program 150 synchronizes the primary DB to the active backup. Program 150 switches or rotates the active backup based on a determined alternating backup period as described in step 206. FIG. 3B illustrates an embodiment where the primary DB has a total database failure, responsively, program 150 initiates a plurality of database remediation actions, as described in step 214. Here, program 150 promotes the active backup to the new primary database and promotes the secondary backup to the active backup. FIG. 3C illustrates an embodiment where the primary DB experiences table corruption (i.e., partial data failure). Here, responsively, program 150 utilizes the active backup to restore the effected table. FIG. 3D illustrates an embodiment where the primary DB and the active backup are both corrupted. Here, program 150 promotes the secondary backup (i.e., last successful backup) as the primary backup and then utilizing transaction logs to restore the system.

Figure 4:
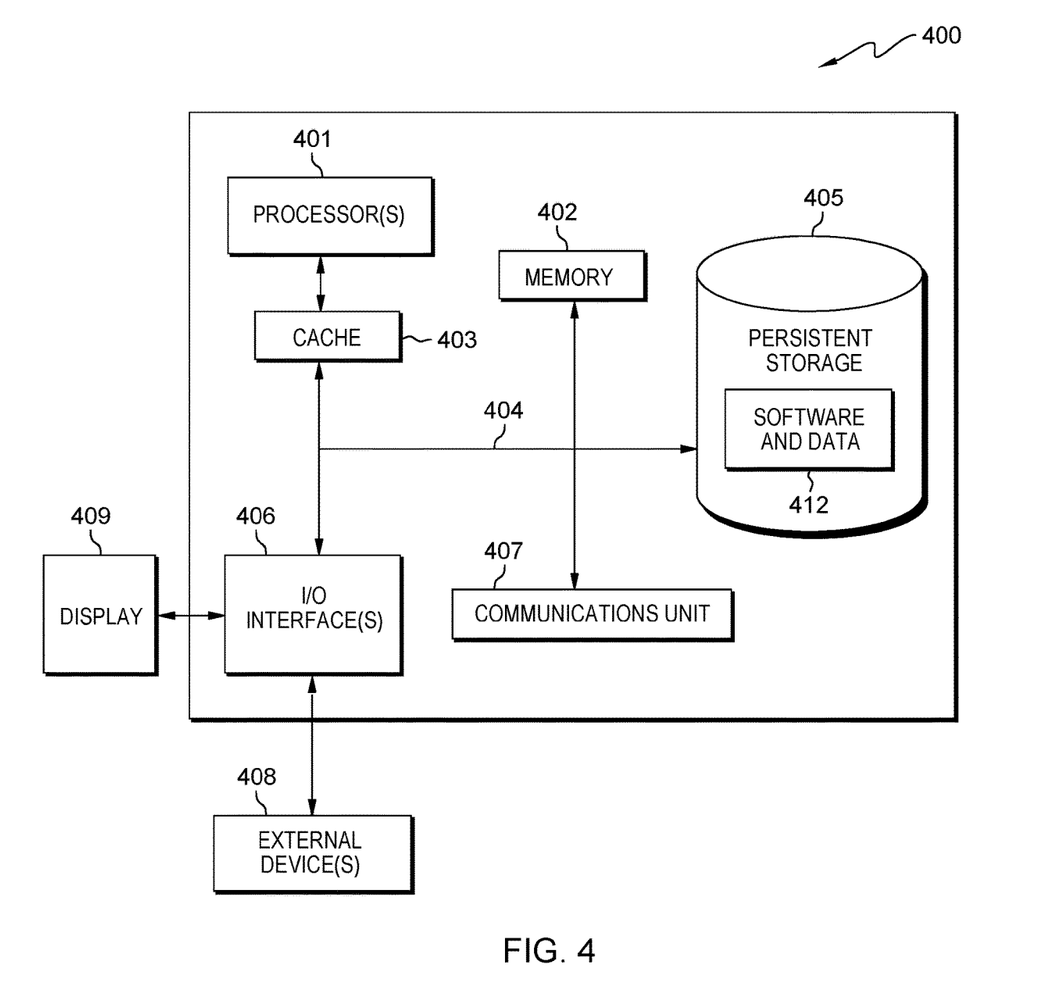
FIG. 4 is a block diagram of components of server computer, in accordance with an embodiment of the present invention.

FIG. 4 depicts block diagram 400 illustrating components of server computer 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 130 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected, respectively, to server computer 130. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
installing, by one or more computer processors, a trigger on a primary database;
responsive to the trigger activating and a data modification associated with the primary database, formatting, by one or more computer processors, the data modification into a universal format for a plurality of backup databases;
determining, by one or more computer processors, an alternating backup period that controls data modification synchronization in a time-share based on an increase in network latency and an amount of transferred data; and
rotating, by one or more computer processors, an active backup database from the plurality of backup databases based on the determined alternating backup period, wherein the determined alternating backup period continuously rotates the plurality of backup databases while synchronizing in real-time the primary database with a rotating backup database.

2. The computer-implemented method of claim 1, further comprising:
monitoring, by one or more computer processors, the primary database for one or more database or table failures.

3. The computer-implemented method of claim 2, further comprising:
responsive to one or more database or table failures associated with the monitored primary database, replacing, by one or more computer processors, the primary database with the active backup database, wherein the active backup database takes over all database operations; and
selecting, by one or more computer processors, a new active backup database from the plurality of backup databases.

4. The computer-implemented method of claim 2, further comprising:
responsive to one or more database or table failures associated with the monitored primary database and the active backup database, selecting, by one or more computer processors, a backup database with a last successful data synchronization from the plurality of backup databases;
replacing, by one or more computer processors, the primary database with the backup database with the last successful data synchronization; and
selecting, by one or more computer processors, a new active backup database from the plurality of backup databases.

5. The computer-implemented method of claim 1, wherein the trigger is based on a number of transactional changes, a specific time interval, or whether a database transfer size threshold is reached.

6. The computer-implemented method of claim 1, wherein the active backup database receives all asynchronous backups of the primary database.

7. A computer program product comprising:
one or more computer readable storage media and program instructions stored on the one or more computer readable storage media, the stored program instructions comprising:
program instructions to install a trigger on a primary database;
program instructions to, responsive to the trigger activating and a data modification associated with the primary database, format the data modification into a universal format for a plurality of backup databases;
program instructions to determine an alternating backup period that controls data modification synchronization in a time-share based on an increase in network latency and an amount of transferred data; and
program instructions to rotate an active backup database from the plurality of backup databases based on the determined alternating backup period, wherein the determined alternating backup period continuously rotates the plurality of backup databases while synchronizing in real-time the primary database with a rotating backup database.

8. The computer program product of claim 7, wherein the program instructions, stored on the one or more computer readable storage media, further comprise:
program instructions to monitor the primary database for one or more database or table failures.

9. The computer program product of claim 8, wherein the program instructions, stored on the one or more computer readable storage media, further comprise:
program instructions to responsive to one or more database or table failures associated with the monitored primary database, replace the primary database with the active backup database, wherein the active backup database takes over all database operations; and
program instructions to select a new active backup database from the plurality of backup databases.

10. The computer program product of claim 8, wherein the program instructions, stored on the one or more computer readable storage media, further comprise:
program instructions to responsive to one or more database or table failures associated with the monitored primary database and the active backup database, select a backup database with a last successful data synchronization from the plurality of backup databases;
program instructions to replace the primary database with the backup database with the last successful data synchronization; and
program instructions to select a new active backup database from the plurality of backup databases.

11. The computer program product of claim 7, wherein the trigger is based on a number of transactional changes, a specific time interval, or whether a database transfer size threshold is reached.

12. The computer program product of claim 7, wherein the active backup database receives all asynchronous backups of the primary database.

13. A computer system comprising: one or more computer processors;
one or more computer readable storage media; and program instructions stored on the computer readable storage media for execution by at least one of the one or more processors, the stored program instructions comprising:

program instructions to install a trigger on a primary database;

program instructions to, responsive to the trigger activating and a data modification associated with the primary database, format the data modification into a universal format for a plurality of backup databases;

program instructions to determine an alternating backup period that controls data modification synchronization in a time-share based on an increase in network latency and an amount of transferred data; and program instructions to rotate an active backup database from the plurality of backup databases based on the determined alternating backup period, wherein the determined alternating backup period continuously rotates the plurality of backup databases while synchronizing in real-time the primary database with a rotating backup database.

14. The computer system of claim 13, wherein the program instructions, stored on the one or more computer readable storage media, further comprise:

program instructions to monitor the primary database for one or more database or table failures.

15. The computer system of claim 14, wherein the program instructions, stored on the one or more computer readable storage media, further comprise:

program instructions to responsive to one or more database or table failures associated with the monitored primary database, replace the primary database with the active backup database, wherein the active backup database takes over all database operations; and program instructions to select a new active backup database from the plurality of backup databases.

16. The computer system of claim 14, wherein the program instructions, stored on the one or more computer readable storage media, further comprise:

program instructions to responsive to one or more database or table failures associated with the monitored primary database and the active backup database, select a backup database with a last successful data synchronization from the plurality of backup databases;

program instructions to replace the primary database with the backup database with the last successful data synchronization; and program instructions to select a new active backup database from the plurality of backup databases.

17. The computer system of claim 13, wherein the trigger is based on a number of transactional changes, a specific time interval, or whether a database transfer size threshold is reached.

18. The computer system of claim 13, wherein the active backup database receives all asynchronous backups of the primary database.

* * * * *